United States Patent [19]

Geisendorfer

[11] 4,364,596
[45] Dec. 21, 1982

[54] VEHICLE PROTECTIVE DEFLECTOR HAVING VISUAL ENHANCEMENT AND ILLUMINATING MEANS

[76] Inventor: Charles E. Geisendorfer, 11600 Huebner, #2105, San Antonio, Tex. 78230

[21] Appl. No.: 136,265

[22] Filed: Apr. 1, 1980

[51] Int. Cl.³ .............................................. B60J 1/20
[52] U.S. Cl. ....................................... 296/91; 362/31
[58] Field of Search ............. 296/91; 40/546; 362/31, 362/80

[56] References Cited

U.S. PATENT DOCUMENTS

| | | | |
|---|---|---|---|
| 1,707,965 | 4/1929 | Scantlebury | 362/31 |
| 2,095,558 | 10/1937 | Oberacker | 362/31 |
| 2,569,130 | 9/1951 | Katsetos | 362/31 |
| 2,692,808 | 10/1954 | Marsh | 362/31 |
| 3,015,517 | 1/1962 | Thornburgh | 296/91 |
| 4,153,129 | 5/1979 | Redmond | 296/91 |

FOREIGN PATENT DOCUMENTS 818287  7/1969  Canada .............................. 296/91

*Primary Examiner*—Joseph F. Peters, Jr.
*Assistant Examiner*—Ross Weaver
*Attorney, Agent, or Firm*—Joseph W. Holloway

[57] ABSTRACT

A deflector shield fixed to the hood of a motor vehicle comprising a mounting bracket and a transparent panel upstanding from the bracket. The panel is recessed in its rear surface to provide visible enhancements. A light source mounted on the bracket emits light into the lower edge of the panel and the recessed surfaces deflect light out of the plane of the panel thereby illuminating the enhancements.

4 Claims, 8 Drawing Figures

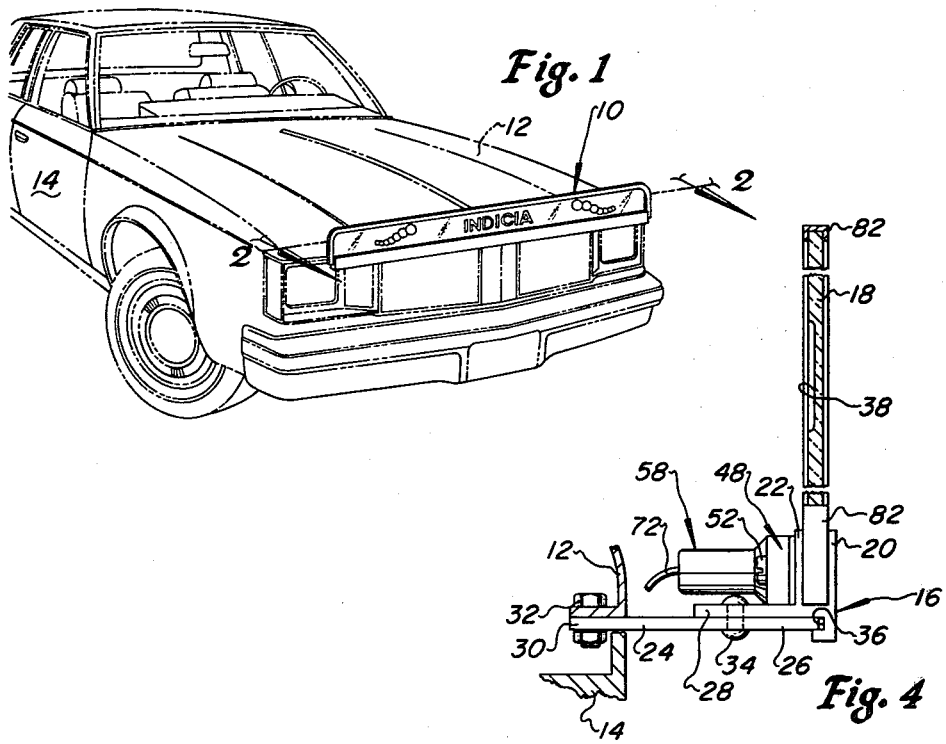
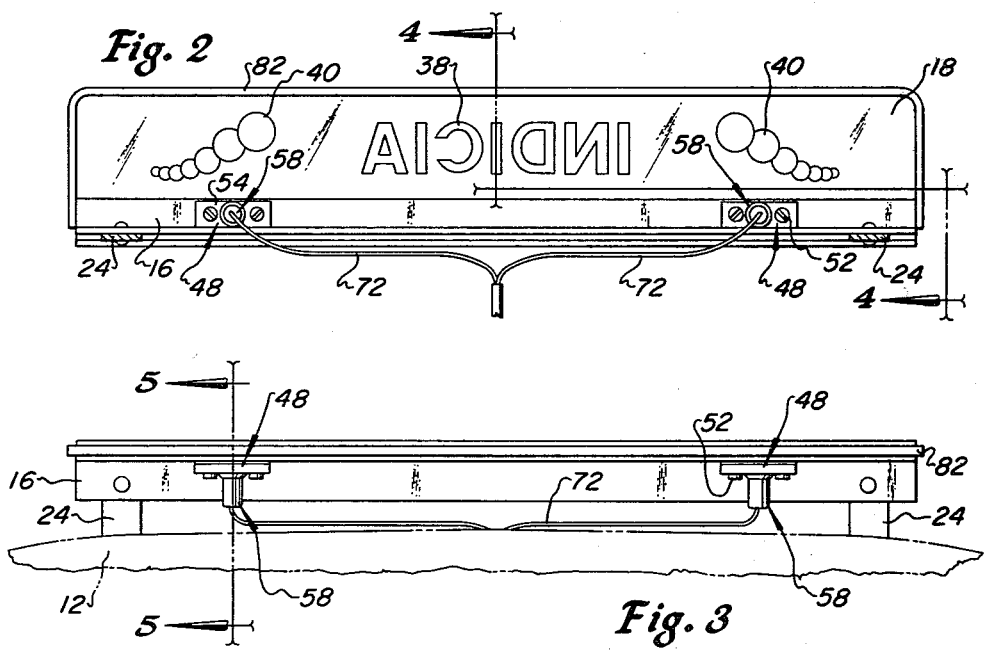

4,364,596

VEHICLE PROTECTIVE DEFLECTOR HAVING VISUAL ENHANCEMENT AND ILLUMINATING MEANS

BACKGROUND OF THE INVENTION

This invention relates to a protective deflector for motor vehicles which are likely to encounter insect spatters, road spray and other airborne material capable of damaging or dirtying the frontal portions of the vehicle. The purpose, function and general structural features of this type of deflector are described in prior U.S. Pat. Nos. 3,015,517; 4,052,099; and 4,153,129. While these prior art deflectors are functionally adequate for their intended purpose, none recognizes the desirability of providing visual enhancement and nighttime illumination for the transparent portion of the deflector as a means for the deflector user to beautify and personalize his vehicle or to communicate to oncoming vehicles and bystanders. Means for illuminating unrelated apparatus associated with motor vehicles are disclosed in U.S. Pat. Nos. 2,072,454 and 2,095,558.

SUMMARY OF THE INVENTION

The object of my invention is to enhance the upstanding transparent panel of a vehicle mounted deflector by recessing the surface of the panel so that recessed portions, which may take the form of indicia, legends, designs and the like, are visible to oncoming traffic and to bystanders. Another object is to combine with the panel mounting bracket a light source which is in circuit with the vehicle electrical system and which is located relative to the bracket and the bottom of the panel for illuminating the recessed portions of the panel. Users of my illuminated deflector panel will be provided a visually distinctive deflective and can extend the usefulness and enjoyment of such visual enhancement to nighttime driving.

Another object is to provide a light source for an illuminated deflector which is compact and readily mountable on a conventional deflector with minimum modification of the deflector and without interference with the deflecting function of the deflector.

Yet another objective is to provide an illuminated deflector which is well suited for mass production techniques yet lends itself to a substantial degree of customization.

A still further objective is to recess the transparent panel surface with indentations created by the application of heat whereby panel material is removed from each indentation and deposited on the panel in a translucent ring or annulus about the opening of the indentation.

DESCRIPTION OF THE DRAWINGS

FIG. 1 is a partial perspective view of a motor vehicle showing the deflector of this invention mounted on the vehicle hood;

FIG. 2 is a rear elevation looking generally along lines 2—2 of FIG. 1;

FIG. 3 is a top plan view of the deflector shown in FIG. 2;

FIG. 4 is a view partially in elevation and partially in section taken along lines 4—4 of FIG. 2 together with a fragment of the vehicle;

DETAILED DESCRIPTION OF THE INVENTION

Figure 6:
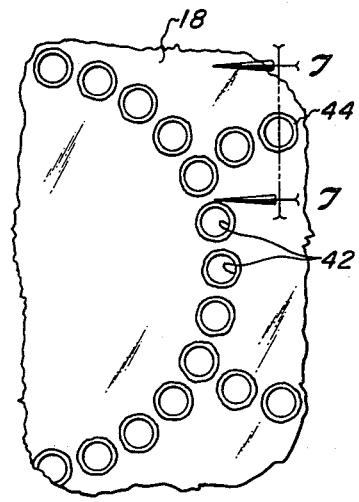
FIG. 6 is a fragmentary rear elevation showing one means for recessing the transparent panel of the deflector.

The deflector indicated in its entirety by numeral 10 in FIG. 1 is provided with means for rigid attachment to the hood 12 of a motor vehicle 14. Deflector 10 essentially comprises an elongated metallic mounting bracket 16 and an upwardly extending panel 18 made of a suitably rigid, transparent material such as, for example, one of those products marketed under the trademarks, "Plexiglass" or "Lucite". The deflector's length should approximate the width of the frontal portion of hood 12, as suggested in U.S. Pat. No. 3,015,517 to Thornburgh; or, in accordance with U.S. Pat. No. 4,052,099 to Lowery et al., the deflector 10 may comprise plural sections which extend laterally across the major portion of hood 12. In any event, the configuration and dimensions of the panel 18 should be related to the frontal features of the vehicle to which it is attached in such a manner that the horizontal and vertical extensions of the panel 18 are sufficient to protect the upper frontal portions of the vehicle and/or its operator from insect spatters, road sprays and other airborne matter. For a more full understanding of how my deflector 10 achieves this one of its multiple functions, reference may be had to prior U.S. Pat. Nos. 3,015,517 and 4,052,099 cited above.

The bracket 16 may be a unitary extrusion having the general configuration shown in U.S. Pat. No. 4,153,129 issued to Redmond. As viewed in FIGS. 4 and 5, the bottom edge of panel 18 is disposed in an upwardly opening channel defined by upstanding walls 20 and 22 of bracket 16 and is secured in the channel by any suitable means to prevent dislocation of the panel 18. The assembly of panel 18 and bracket 16 may be accomplished in accordance with the disclosure of U.S. Pat. No. 4,153,129.

A pair of attachment arms 24 rigidly secure the deflector 10 in horizontally spaced relationship to the hood 12. As best shown in FIG. 4, the front end portion 26 of each arm 24 underlies a rearwardly extending flange 28 of bracket 16 while the rear end portion 30 of each arm 24 extends rearwardly under hood 12 and is securely attached thereto by a bolt 32 or other suitable fastener. Each front arm end 26 is secured to flange 28 by suitable means such as a rivet 34 and has its forwardmost end positioned in channel 36 which extends the length of bracket 16. While the deflector 10 has specific means for mounting on the hood 12 of an automobile or a truck it will be apparent that the invention can be carried out by mounting the deflector on other frontal portions of a vehicle. Moreover, the deflector 10 is susceptible of modification for mounting on a motorcycle or bicycle without departing from the spirit of the invention disclosed herein.

Turning now to a principal objective of my invention, I have provided a deflector 10 which not only protects the vehicle 14 in the manner described hereinbefore, but also combines with this primary function a heretofore unappreciated means for enhancing the visual appearance and distinctiveness of the deflector without diminishing the effectiveness of the deflector's protective function. As shown in FIGS. 1 and 2, the panel 18 has been provided with indicia 38 across its center portion and with ornamental designs 40 adjacent its opposite ends. The possible selections of indicia, legends, ornamental designs and pictorial representations for application to panel 18 are, of course, unlimited and may be customized to suit individual users. For example, the indicia could identify the vehicle operator by name or could designate a citizens band radio call name or "handle". The indicia might well publicize a business or otherwise have commercial advertising value. Police, firefighting and emergency vehicles of all types may be made more easily distinguishable in traffic by an identifying legend inscribed on a deflector mounted on such vehicles. Ornamental designs or pictorial representations on the deflector give satisfaction of those vehicle operators who desire to beautify and personalize their vehicle accouterments in a distinctive fashion.

Figure 7:
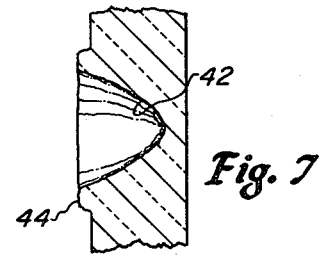
FIG. 7 is a fragmentary section taken along lines 7—7 of FIG. 6.

Since the material of which panel 18 is preferably made is workable, the selected graphic or pictorial representations may be inscribed in the panel by removing or deforming panel material with simple hand tools or with a power tool such as a router. As shown in FIG. 4, for example, the rear surface of panel 18 facing the vehicle 12 has been worked to remove panel material to a substantial depth to form the character "I" of indicia 38. The interlocking circles of the designs 40 may be made by simply incising the panel surface with a sharp edged tool. Alternatively, as shown in FIGS. 6 and 7, the designs and the indicia may be formed in the panel surface by a series of spaced indentations 42 formed by melting part way through the polymeric material by means of a heated instrument having a shaped point. As indicated best in FIG. 7, the material which is thermally softened flows outwardly from indentations 42 and subsequently rehardens in the form of raised annuli 44 on the panel surface surrounding the perimeters of indentations 42. Spaced indentations could also be formed by drilling part way through the panel material.

The recesses in the panel 18, in the form of grooves, incisions and indentations achieved by the various methods just described, extend into the panel surface from the side facing the vehicle; however, none extend completely through to the panel. Otherwise, forward facing recesses would become impacted with hard-to-remove material; and, if they penetrated the panel completely, the protective shielding effect of the panel would be compromised. Another common characteristic of the various recesses is that, in the process of forming them in the panel material, the panel surfaces defining the recesses are scarified by working or melting and become translucent instead of transparent. Such different light transmitting characteristics of the transparent panel body and the translucent recess walls provide sufficient visual contrast to render the same visible under daylight conditions.

While light from an external source such as the headlights of oncoming vehicles provides sufficient nighttime illumination of the aforedescribed indicia and designs to give a substantial degree of visibility thereto, the deflector 10 is provided with its own lighting source which permits full realization of user benefits under ambient nighttime road conditions and even in total darkness. Thus an important feature of the present invention resides in a novel combination of a protective vehicle deflector having visual enhancements which may be made visible even at night by means of a light source associated with the deflector.

A preferred light source for illumination of the indicia 38 and designs 40 comprises one or more electric bulbs 46 positioned relative to panel 18 so that light rays from the bulb enter the transparent panel material edgewise closely adjacent to the lower edge of the panel. Light rays introduced edgewise into the panel will traverse the panel material so nearly parallel to the side faces of panel that they will be totally reflected within the panel whereby the smooth surfaces of the panel side faces will not be visibly illuminated. Light rays from bulbs 46 which strike the edge surfaces of the panel at right angles will, unless otherwise prevented from doing so, pass through the edge surfaces in the form of stray illumination. Light rays which strike the scarified or otherwise roughened surfaces of the recessed indicia 38 and designs 40 will be refracted or reflected and dispersed out of the planes of the panel side faces. In striking visual contrast with the non-illuminated smooth portion of the panel faces, the light dispersing recesses which form the indicia and designs will appear to glow brilliantly in the dark. I have discovered that the aforedescribed annuli 44 of rehardened panel material which surrounds the heat produced indentations 42 refract or reflect the light rays passing there through in a manner that causes the annuli and the designs they produce to sparkle in a particularly appealing and striking manner.

The preferred means for mounting each bulb 46 relative to the lower edge of panel 18 comprises a shallow retangular metal box 48 abutting the bracket flange 28 and having an open top which faces the wall 22 of bracket 16. I prefer to locate the mounting box 48 rearwardly of the panel 18 which serves to protect the box and structures projecting therefrom from damaging impacts from rocks and which avoids the need to clean around the box during periodic cleaning of the panel 18. Moreover, by locating the box in this manner and limiting its vertical dimension so that it does not extend above bracket wall 22, the box does not detract from the appearance of the deflector, obstruct visibility through the panel 18 or interrupt the beneficial flow of air currents passing over the front of the deflector.

Disposed around the perimeter of the top edge of box 48 and lying between the box top edge and wall 22 is a generally rectangular gasket 50 of resilient material. A pair of sheet metal screws or like threaded fasteners 52 penetrate the rear wall 54 of box 48 and threadably engage with the bracket wall 22 to hold the box 48 and wall 22 in compressive sealing engagement with the gasket 50 thereby preventing the escape of light and the entrance of dirt or moisture between the box and the bracket wall. The rear wall 54 of box 48 has a circular aperture, not shown, which is coaxially aligned with the hollow cylindrical housing 56 of a well known type of low voltage bulb receptacle 58. A tubular metallic sleeve 60 fits into housing 56 which is made of electrical insulating material. The forward end of sleeve 60 has projecting prongs 62 which are bent outwardly and rearwardly to form spring elements which resilienty engage the wall of the aperture in the rear wall 54 of box 48 to detachably retain the receptacle 58 to the box 48 in the position shown in FIG. 5. In the assembled condition shown in FIG. 5, the outwardly flared forward end of housing 56 presses tightly against the rear wall 54 of box 48 to seal out dirt and moisture and to prevent the escape of light emitted from bulb 46. A spring biased plunger 64 of insulating material carries a contact 66 which is pressed into electrical engagement with an aligned contact 68 on the base 70 of bulb 46. An insulated lead wire 72 is attached to the contact 66 and extends rearwardly through a close fitting aperture in the rear wall of housing 56. The base 70 of bulb 46 is releasably connected to the sleeve 60 by interfitting engagement between projecting lugs 74 and J-slots, not shown, relieved in the wall of sleeve 60. In a well known manner, the bulb 46 may be assembled and disassembled from the receptacle by pushing the bulb to compress the spring acting on plunger 64 and thereafter rotating the bulb 46.

The globe portion 76 of bulb 46 is received in closely surrounded relationship with the walls of a pair of aligned apertures 78 and 80 penetrating the bracket wall 22 and the bottom portion of panel 18, respectively. Apertures 78 and 80 may be formed by applying a suitably sized rotary drill bit at right angles to the wall 22; and, the fasteners 52 which secure box 48 to bracket 16 are preferably of the self threading type whereby assembley of the box to the bracket is easily accomplished by seating the screws in predrilled aligned holes in the rear wall 54 of box 48 and the bracket wall 22. Therefore, minimal skill and readily available tools are required to prepare the deflector structure to receive the bulb 46 and thereafter, to assemble the box 48 and receptacle 58 with the bracket 16. The forward portion of globe 76 directly underlies the panel 18 for emitting light rays into the panel through the surrounding wall of the aperture 80. The contiguous walls of apertures 78 and 80 provide a protective chamber for the fragile globe thereby obviating the need for a special protective housing for this purpose.

From the foregoing description it will be appreciated that a deflector may be equiped for edge illumination of panel 18 by a compact and easily installed means which advantageously utilizes the existing structure of the deflector bracket as a mounting base and also utilizes portions of the bracket and the panel to protect the bulb from physical shock and from contamination by dirt and moisture.

Figure 5:
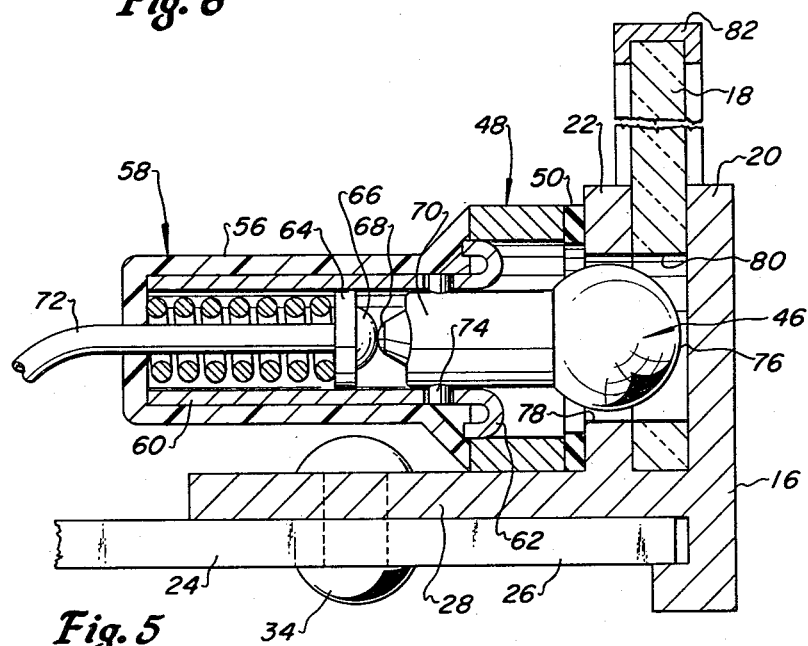
FIG. 5 is a section taken generally along lines 5—5 of FIG. 3.
Figure 8:
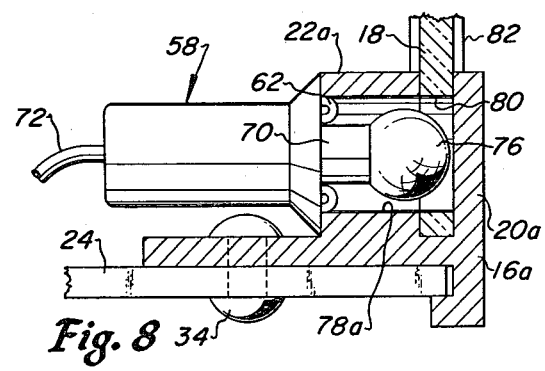
FIG. 8 is a partial sectional view similar to FIG. 5 showing a modified embodiment of the invention.

In another embodiment of my invention which is illustrated in FIG. 8, the wall 22A of the mounting bracket 16A has been thickened so that the front-to-rear dimension of wall 22A is the same or approximately the same as the combined front-to-rear dimensions of wall 22, gasket 50, and box 48 as viewed in FIG. 5. The modified wall 22A has a transverse aperture 78A which receives and retains the resilient prongs 62 of the receptacle 58 and surrounds portions of the base 70 and globe 76. This embodiment eliminates the need for a discrete mounting box 48, gasket 50 and screws 52 which are structually and functionally replaced by receptacle mounting means integral with the bracket 16A as just described. In mass production, the increased costs of providing a thickened wall 22A would be more than offset by labor savings due to elimination of assembly operations required to fabricate and install the box 48. Likewise, in mass production, a multipicity of apertures 78A and panel apertures 80 aligned therewith could be predrilled at intervals along the length of wall 22A. Selected ones of such predrilled apertures 78A, 80 could be fitted with bulb receptacles 58 to meet the illumination requirements of a wide variety of mass produced panel indicia and designs. The forward ends of those apertures 78A, 80 not fitted with receptacles would be closed and protected by the forward bracket wall 20A.

To minimize stray illumination from the top and side edge surfaces of panel 18 and to reflect light rays back into the panel material, I have provided a U-shaped strip 82 which compressively engages and extends about the top and sides of panel 18. The strip 82 may be securely affixed to the panel by a suitable adhesive. The flat bottom surface of strip 82 which faces the edge surfaces of panel 18 should have good light reflective properties. If made of metal, the reflective surface should be clean and polished. If made of plastic or like material, the reflective surface may comprise a thin tape of reflective material, not shown, secured in the strip channel. The strip 82 also functions to absorb impacts from flying rocks and the like thereby reducing the chance of chipping the panel edge.

The electrical supply for the bulbs 46 may conveniently comprise a branch of a conventional vehicle headlight circuit. To this end, the bulb base 70 is grounded to the vehicle frame through a circuit comprising lugs 74, metallic sleeve 60, box 48, fasteners 52, bracket 16 and attachment arms 24. The lead wires 72 extending from both receptacles 58 may be joined and routed beneath the hood 12, as shown in FIG. 3, for connection in circuit with the vehicle headlights and the usual switch apparatus for the headlights. Alternatively, the bulbs 46 could be wired in an electrical circuit independent of the vehicle headlights with such circuit having a driver controlled on-off switch whereby the driver of an emergency vehicle, for example, could selectively illuminate an identifying legend on the deflector only when the vehicle is on an emergency mission.

The location and number of bulb receptacles 58 can be varied from those shown in the drawings to vary the intensity of illumination at selected points along the length of panel 18. The incandescent bulbs 46 may be replaced by other light sources such as minature tube-type bulbs or others which can be mounted for light emmission into the bottom portion of the transparent panel 18 as taught by the present invention. To heighten the effect of nighttime illumination of my deflector, the panel may be made of colored or tinted material and the bulbs may likewise be colored. A suitable automatic current interrupter or blinking device, not shown, may be installed in circuit with the bulbs to further attract attention to the visual aspects of the illuminated deflector.

I claim as my invention:

1. In a protective deflector mountable on the frontal portion of a vehicle and having an upstanding transparent panel with a surface facing toward said vehicle, the improvement comprising: recess means in said surface opening toward said vehicle for providing visual enhancement for said panel; said recess means opening to said surface and the periphery of the openings of said recess means being surrounded by raised annuli of panel material disposed on said surface.

2. The deflector defined in claim 1 together with electrically operable illuminating means mounted on said deflector in illuminating relation with said panel for rendering said recess means visible in the darkness.

3. In a protective deflector mountable on the frontal portion of a vehicle and having an upstanding transparent panel with a surface facing toward said vehicle, the improvement comprising; recess means in said surface opening toward said vehicle for providing visual enhancement for said panel; said recess means being defined by walls that are translucent; electrically operable illuminating means mounted on said deflector in illuminating relation with said panel for rendering said recess means visible in the darkness; said deflector including mounting means for said panel; said illuminating means being disposed on said mounting means proximate an edge of said panel; said illuminating means comprising an electric light assembly including a bulb and a receptacle for said bulb; said receptacle being supported on said mounting means with said bulb extending from said receptacle for emitting light edgewise into said panel; said panel and said mounting means having abutting apertured portions; said apertures being coaxial and together defining a cavity; a portion of said bulb extending into one end of said cavity which opens toward said vehicle; and, said mounting means having another portion closing the other end of said cavity.

4. A method for providing visual enhancement for a transparent panel portion of a vehicle protective deflector comprising the steps of:
   providing a transparent panel of thermal plastic material;
   applying heat locally to said panel by means of an instrument having a heated, shaped tip;
   pressing said tip into said material after it becomes plastic whereby said material is displaced by said tip forming a recess therein;
   discontinuing the application of heat and pressing said tip into said material before said panel is pierced through; and
   allowing the material displaced from said recess to cool and reharden in an anulus about the opening of said recess to the surface of said panel.

* * * * *